(12) United States Patent
Oshima et al.

(10) Patent No.: US 6,444,016 B2
(45) Date of Patent: Sep. 3, 2002

(54) HYDROGEN STORAGE UNIT

(75) Inventors: Hisayoshi Oshima, Obu; Hidehiko Hiramatsu, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/799,808

(22) Filed: Mar. 7, 2001

(30) Foreign Application Priority Data

Mar. 8, 2000 (JP) ........................................ 2000-068665
Jan. 19, 2001 (JP) ........................................ 2001-011932

(51) Int. Cl.⁷ ............................ B01D 53/04; F17C 11/00
(52) U.S. Cl. ............................. 96/111; 96/126; 96/132; 96/146; 206/0.7
(58) Field of Search ..................... 96/108, 111, 109, 96/126, 130, 132, 134, 143, 146; 206/0.7; 423/248, 648.1; 420/900; 502/526

(56) References Cited

U.S. PATENT DOCUMENTS

| 4,108,605 A | * | 8/1978 | Billings |
| 4,183,369 A | * | 1/1980 | Thomas |
| 4,343,770 A | * | 8/1982 | Simons |
| 4,389,239 A | * | 6/1983 | Klatt et al. |
| 4,444,727 A | * | 4/1984 | Yanagihara et al. |
| 6,068,683 A | * | 5/2000 | Carnes et al. ................... 96/4 |
| 6,267,229 B1 | * | 7/2001 | Heang ........................ 206/0.7 |

FOREIGN PATENT DOCUMENTS

JP 62-246699 10/1987

* cited by examiner

*Primary Examiner*—David A. Simmons
*Assistant Examiner*—Frank M. Lawrence
(74) *Attorney, Agent, or Firm*—Harness, Dickey & Pierce, PLC

(57) ABSTRACT

A hydrogen storage unit is provided with a hydrogen storage container containing a hydrogen absorption material, and a filter portion for eliminating impurities contained in stored hydrogen gas. Thereby, the impurities are eliminated from the stored hydrogen gas in the hydrogen storage container, and the hydrogen absorption material is prevented from being poisoned by the impurities. The filter portion can be provided either inside or outside the hydrogen storage container. An adsorbent for adsorbing the impurities can be used in the filter portion. The filter portion is provided with a heating means for enhancing the elimination of the impurities adsorbed in the filter portion, and can be recovered during operation.

13 Claims, 5 Drawing Sheets

HYDROGEN STORAGE UNIT

CROSS-REFERENCE TO RELATED APPLICATION

The present invention is related to Japanese patent application No. 2000-68665, filed Mar. 8, 2000; 2001-11932, filed Jan. 19, 2001 the contents of which are incorporated herein by reference.

FIELD OF THE INVENTION

The present invention relates to a hydrogen storage unit, and more particularly, to a hydrogen storage unit for charging and discharging hydrogen gas.

BACKGROUND OF THE INVENTION

Conventionally, hydrogen storage units provided with hydrogen absorption material for absorbing hydrogen gas (such as a hydrogen absorption alloy), have been proposed. Such a hydrogen storage unit is proposed in JP-A-62-246699. Here, a conventional hydrogen storage unit is provided with a hydrogen absorption alloy within a hydrogen storage container and a filter portion having an adsorbent within the hydrogen storage container. If the hydrogen absorption alloy is poisoned by impurities such as moisture and air, the hydrogen absorption capacity is degraded. Therefore, the poisoning materials described above are selectively adsorbed by the adsorbent in order to prevent the hydrogen adsorption capacity from being degraded.

In the conventional hydrogen storage unit, when hydrogen gas supplied from hydrogen supply equipment is absorbed in the hydrogen absorption alloy, the hydrogen gas passes through the filter portion, and the poisoning materials described above are adsorbed therein. Further, when hydrogen gas is discharged to hydrogen consumption equipment set outside the storage tank, the hydrogen gas again passes through the filter portion. Then, the filter portion adsorbent degrades due adsorption of the above-described poisoning materials, thereby losing the hydrogen adsorption capacity. Therefore, the filter portion adsorbent is moved outside the hydrogen storage unit and is heated to recover hydrogen adsorption capacity.

In the conventional hydrogen storage unit, the filter portion adsorbent must be moved to a different place in order to recover the filter portion adsorbent, thereby making recovery troublesome.

SUMMARY OF THE INVENTION

In view of these and other drawbacks, a hydrogen storage unit according to the present invention, comprises a hydrogen storage container containing a hydrogen absorption material, a filter portion and a heat supply means. Here, the filter portion includes an adsorbent for adsorbing impurities contained in hydrogen gas stored in the hydrogen storage unit. Further, the heat supply means, provided in the filter portion, includes heating means for heating the filter portion to enhance elimination of impurities adsorbed in the adsorbent.

Therefore, the elimination of the impurities from the adsorbent is enhanced by heating the filter portion with the heat supply means, and the adsorbent can be recovered.

Since adsorption capacity of the adsorbent is increased as temperature decreases, the heat supply means according to another aspect includes a cooling means for cooling the filter portion adsorbent to enhance the adsorption of impurities in the filter portion.

In another aspect, the heating means is controlled based on purity of hydrogen gas discharged. When impurities are not contained in the hydrogen gas, it can be determined that the elimination of impurities from the filter portion is completed. Accordingly, if it is determined whether or not the heating means stops heating the filter portion based on the purity of discharged hydrogen gas, the filter portion can be prevented from being heated more than required by the heating means.

In another aspect, the heating means is controlled based on the hydrogen gas charge. For example, the time expended for charging hydrogen gas into the hydrogen storage container can be used as information relating to the hydrogen gas discharge. That is, as charging time of hydrogen gas becomes longer, the amount of impurities adsorbed in the filter portion becomes larger. As the amount of impurities adsorbed in the filter portion becomes larger, the time required for heating the filter to eliminate the impurities from the filter portion becomes longer. On the contrary, as hydrogen gas charging time becomes shorter, the time required to heat the filter portion becomes shorter.

Furthermore, for example, the amount of charged hydrogen gas can be used as information relating to the hydrogen gas charge. In this case, as the amount of charged hydrogen gas becomes larger, the amount of impurities adsorbed in the filter portion becomes larger, and the heating time of the heating means must be longer. When the amount of charged hydrogen gas is small, the heating time shortened.

In another aspect, the heating means is controlled based on information relating to hydrogen gas consumption. For example, the amount of hydrogen gas discharged into the hydrogen consumption equipment can be used as the information relating to hydrogen gas consumption. That is, as the amount of hydrogen gas passing through the filter portion becomes larger, impurities are eliminated from the filter portion more rapidly, and the heating time of the filter portion by the heating means can be shortened. On the contrary, when the amount of hydrogen gas passing through the filter portion is small, impurities are eliminated from the filter portion slowly, so that the heating time of the filter portion by the heating means must be longer.

The above-described filter portion can be provided outside the hydrogen storage container or inside. If inside, both of the hydrogen storage container and the filter portion can be heated and cooled by one heating means and one cooling means.

In another aspect, the filter portion and the hydrogen storage container are disposed so that hydrogen gas flows through the filter portion in a hydrogen storage mode (where hydrogen gas is stored in the hydrogen storage container) and a hydrogen discharge mode (where hydrogen gas is discharged outside the hydrogen storage container).

The impurities generated by recovering the filter portion are discharged outside the hydrogen storage container together with hydrogen gas discharged outside in the above-described hydrogen discharge mode. Therefore, the impurities generated during recovery cannot be adsorbed in the hydrogen absorption material within the hydrogen storage container, thereby not poisoning the hydrogen absorption material.

Another aspect includes a first supply portion connected to a hydrogen supply equipment, a second supply portion connected to a hydrogen consumption equipment, a third supply portion connected to the hydrogen storage container, and a supply line including a switching portion. Here, the switching portion switches connections between the first supply portion and the third supply portion and connection conditions between the second supply portion and the third supply portion.

Accordingly, in the hydrogen storage mode, connection is performed between the first supply portion and the third supply portion, and connection is interrupted between the second supply portion and the third supply portion, thereby supplying hydrogen gas inside the hydrogen storage container from the hydrogen supply equipment through the filter portion. On the contrary, in the hydrogen discharge mode, connection is interrupted between the first supply portion and the third supply portion, and connection is performed between the second supply portion and the third supply portion, thereby supplying hydrogen gas into the hydrogen consumption equipment from the hydrogen storage container through the filter portion.

In another aspect, the hydrogen storage container has one closed end and another end having a hydrogen supply port, and the filter portion can be disposed at the hydrogen supply port to make hydrogen gas pass through the filter portion in both the hydrogen storage mode and the hydrogen discharge mode. Further, the hydrogen storage container can be bottle shaped, where one end is closed and the other end has a hydrogen supply support, so that the hydrogen storage container has another advantage of not requiring a specific structure as the hydrogen storage container.

In another aspect, the hydrogen storage container and the filter portion may be separated from each other, a valve may be provided therebetween set to open during hydrogen gas charging and discharging. Thereby, when the filter portion must be replaced due to failure, impurity gases are prevented from entering the hydrogen storage container by closing the valve during replacement.

In another aspect, the heating and cooling sequences of the hydrogen storage container and the filter portion may be changed between hydrogen gas charging time in the hydrogen storage container and the time of discharging hydrogen gas from the hydrogen gas container. Impurities must be eliminated from hydrogen gas during initial charging. At this time, since the filter portion is first cooled, impurities can be more effectively eliminated from hydrogen gas by the filter portion. Since the hydrogen storage container is first heated during discharging, the impurities from the filter portion are not preferentially discharged, thereby preventing excessive purity degradation of discharged hydrogen gas.

In another aspect, impurities can be more effectively eliminated from hydrogen gas during hydrogen-gas charging, and the purity of discharged hydrogen gas can be prevented from excessively degrading during hydrogen-gas discharging.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

Figure 1:
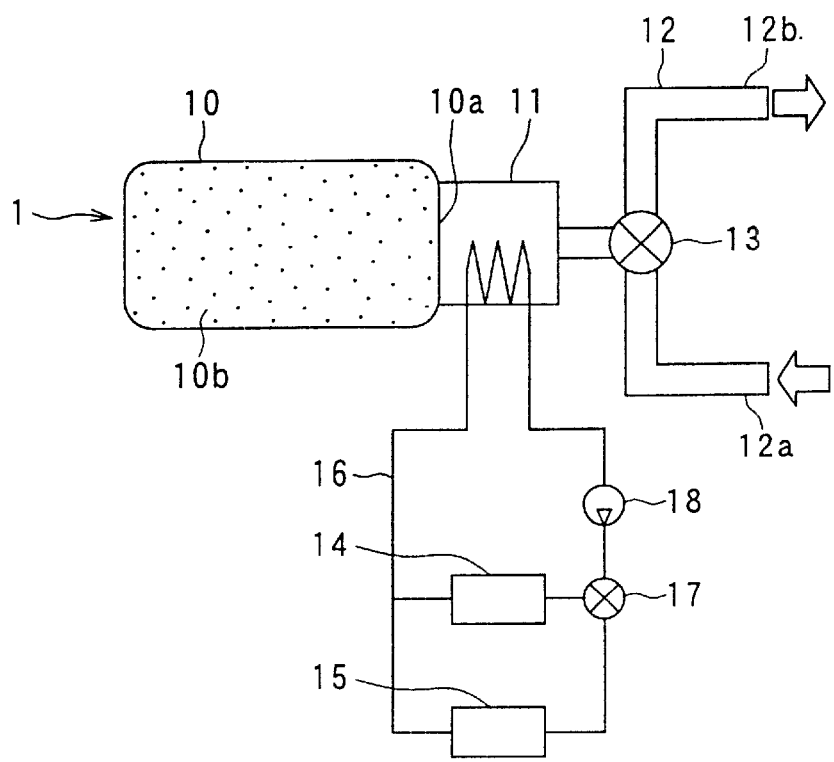
FIG. 1 is a schematic view showing a hydrogen storage unit according to a first embodiment of the invention.

Hereinafter, a hydrogen storage unit according to a first embodiment of the present invention will be described. As shown in FIG. 1, the hydrogen storage unit 1 according to the present embodiment includes a hydrogen storage container 10 in which hydrogen gas is stored, and a filter portion 11 for eliminating impurities contained in hydrogen gas stored from the hydrogen gas. The filter portion 11 is provided outside a hydrogen supply port 10a of the hydrogen storage container 10 (outside the hydrogen storage container).

A hydrogen absorption alloy is contained in the hydrogen storage container 10 as a hydrogen absorption material 10b for absorbing hydrogen gas (e.g., LaNi5). In the present embodiment, active carbon, which is an adsorbent for adsorbing impurities poisoning the hydrogen absorption alloy 10b (especially, moisture), is used as the filter portion 11, and is contained within the container (not shown). In the hydrogen storage unit 1, piping (supply line) 12 includes two connection portions 12a, 12b connected to outside equipment. Hydrogen supply equipment (e.g., a hydrogen bottle) 100 is connected to the supply-equipment connection portion (first supply portion) 12a, and a hydrogen consumption equipment (e.g., a hydrogen fueled engine and a fuel cell) 200 is connected to the consumption-equipment connection portion (second supply portion) 12b. Further, a hydrogen-storage-container connection portion (third supply portion) 12c connected to the hydrogen storage container 10 is provided in the piping 12.

Further, a switching valve 13 for switching hydrogen-gas flowing routes is provided in the piping 12, and is operated in the following manner. When hydrogen gas is charged in the hydrogen storage container 10, the hydrogen gas flows in the piping 12 from the supply-equipment connection portion 12a to the hydrogen-storage-container connection portion 12c. When hydrogen gas is discharged from the hydrogen storage container 10, the hydrogen gas flows in the piping 12 from the hydrogen-storage-container connection portion 12c to the consumption-equipment connection portion 12b. When hydrogen gas is stored in the hydrogen storage container 10, the switching valve is closed.

In the filter portion 11, heating and cooling means 14–19 are provided. A heat supplying means according to the present invention is constructed by the heating and cooling means 14–19. The heating and cooling means 14–19 include a cooling means 14, a heating means 15 and a heat radiating coil 19.

The adsorption capacity of the adsorbent becomes larger at lower temperatures according to its characteristics. In the present embodiment, therefore, the filter portion 11 is cooled by the cooling means 14 during hydrogen gas charging, thereby enhancing adsorption of impurities contained in hydrogen gas in active carbon, and improving the impurity eliminating capacity of the filter portion 11.

Alternatively, the adsorbent is activated when heated, thereby facilitating elimination of material adsorbed thereon. In the present embodiment, therefore, the filter portion 11 is heated by the heating means during hydrogen gas discharge, thereby enhancing elimination of impurities from the adsorbent.

Further, a cooling heat exchanger such as a radiator can be used as the cooling means 14. Further, heat, generated by the hydrogen consumption equipment such as a hydrogen fueled engine and a fuel cell, can be utilized as heat generated by the heating means 15. Through a heat medium (e.g., fluid such as water) flowing in a heat medium passage 16, the filter portion 11 is cooled by a radiator 14 and is heated by a heater 15. The heat medium passage 16 is provided with a switching valve 17 for switching heat-medium routes between the radiator 14 and the heater 15, and a pump 18 for circulating the heat medium.

The temperature of the filter portion 11 cooled by the radiator 14 and heated by heater 15 is appropriately set according to material of the adsorbent and the like. If the adsorbent material is not required to be cooled or heated, the radiator (cooling means) 14 or the heater (heating means) 15 can be eliminated.

The hydrogen storage container 10 can be provided with heating and cooling means for heating and cooling the hydrogen storage container 10 separately from the heating and cooling means 14, 15 in the filter portion 11.

Next, the operation of the hydrogen storage unit 1 is described. When hydrogen gas is charged from the hydrogen supply equipment into the hydrogen storage unit 1, the switching valve 13 is switched to set the hydrogen-gas flowing route from the supply-equipment connection portion 12a to the hydrogen storage unit 1. Thereby, hydrogen gas is supplied (charged) from the hydrogen supply equipment outside into the hydrogen storage unit 1. In the hydrogen storage unit 1, hydrogen gas having flowed into the piping 12 flows into the hydrogen storage container 10 through the filter portion 11. At this time, the filter portion 11 is cooled at about room temperature by the radiator 14 through the heat radiating coil.

When hydrogen gas passes through the filter portion 11, impurities such as air and moisture contained in hydrogen gas are adsorbed by the active carbon of the filter portion 11 and eliminated from hydrogen gas. At this time, the filter portion 11 is cooled by the cooling means 14 as described above, thereby enhancing the adsorption of the impurities contained in hydrogen gas by the active carbon.

In the hydrogen storage container 10, hydrogen gas is absorbed in the hydrogen absorption alloy 10b as hydrogen-gas pressure increases in the hydrogen storage container 10. Since hydrogen gas, from which impurities have been beforehand eliminated by the filter portion 11, flows into the hydrogen storage container 10, the hydrogen absorption alloy 10b cannot be poisoned by the impurities. Accordingly, the absorption capacity of the hydrogen absorption alloy 10b is not degraded.

When hydrogen gas is discharged from the hydrogen storage unit 1 to the hydrogen consumption equipment, the switching valve 13 is switched to set the hydrogen-gas flowing route from the hydrogen storage unit 1 to the consumption-equipment connection portion 12b. Thereby, hydrogen-gas pressure within the hydrogen storage container 10 is reduced, and hydrogen gas is discharged from the hydrogen absorption alloy 10b. The hydrogen gas discharged from the hydrogen absorption alloy 10b is supplied (discharged) to the hydrogen consumption equipment set outside through the filter portion 11.

At this time, the filter portion 11 is heated by the heater 15 at about 100° C., for example. Accordingly, the active carbon of the filter portion 11 is activated to enhance the elimination of the impurities from the active carbon. Then, when hydrogen gas passes through the filter portion 11, the impurities, adsorbed by the active carbon during hydrogen gas charging, are eliminated from the active carbon. Thereby, the impurities are eliminated from the active carbon, and the filter portion 11 recovers. The impurities eliminated from the active carbon are contained in hydrogen gas discharged into the hydrogen consumption equipment. The hydrogen storage unit 1 according to the present embodiment includes the filter portion 11 for eliminating impurities contained in hydrogen gas, thereby preventing the hydrogen absorption alloy 10b from being poisoned, and preventing the hydrogen absorption capacity of the hydrogen absorption alloy 10b from being degraded.

Since the adsorption capacity of the adsorbent is degraded as the adsorbent adsorbs impurities, when its operating time reaches its elimination life time (i.e., when the adsorption capacity of the active carbon becomes insufficient), the adsorbent must be replaced or removed. In the hydrogen storage unit 1 according to the present embodiment, the filter portion 11 is provided with the heating means 15, thereby enhancing the elimination of impurities from the filter portion adsorbent 11, and recovering the adsorption capacity of the adsorbent. Accordingly, the filter portion 11 can be recovered during operation.

Further, the filter portion 11 is also provided with the cooling means 14, and is cooled during hydrogen gas charging, thereby enhancing the adsorption of impurities by the adsorbent, and improving the impurity elimination capacity of the filter portion 11.

SECOND EMBODIMENT

Figure 2:
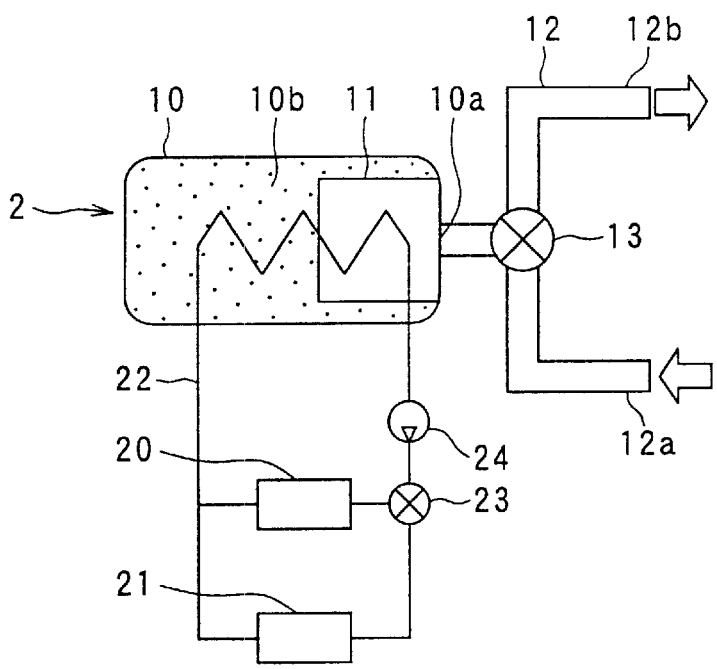
FIG. 2 is a schematic view showing a hydrogen storage unit according to a second embodiment of the invention.

As shown in FIG. 2, the hydrogen storage unit 2 according to the second embodiment is provided with the filter portion 11 at an inner side of the hydrogen supply port 10a of the hydrogen storage container 10 (inside the hydrogen storage container 10). Further, the hydrogen storage unit 2 is also provided with the hydrogen absorption alloy 10b contained in the hydrogen storage container 10, a radiator (cooling means) 20 for cooling the filter portion 11 and a heater (heating means) 21 for heating the filter portion 11. Since the heat radiating coil 19 is arranged in both the hydrogen storage container 10 and the filter portion 11, both are cooled by the radiator 20 or heated by the heater 21 through a heat medium (e.g., fluid such as water) flowing within a heat medium passage 22. The heat medium passage 21 is provided with a switching valve 23 for switching the heat-medium routes between the radiator 20 and the heater 21, and a pump 24 for circulating the heat medium.

Next, the operation of the hydrogen storage unit 2 according to the second embodiment will be described. When hydrogen gas is charged into the hydrogen storage unit 2, the hydrogen absorption alloy 10*b* generates heat during absorbing hydrogen gas. Therefore, the hydrogen absorption alloy 10*b* must be cooled by the radiator 20. At the same time, the filter portion 11 is also cooled to improve the adsorption capacity of the active carbon of the filter portion 11. When hydrogen gas is discharged from the hydrogen storage unit 2, the hydrogen absorption alloy 10*b* absorbs heat during discharging hydrogen gas. Therefore, the hydrogen absorption alloy 10*b* must be heated by the heater 21. At the same time, the filter portion 11 is also heated to enhance the elimination of impurities from the active carbon.

THIRD EMBODIMENT

Figure 3:
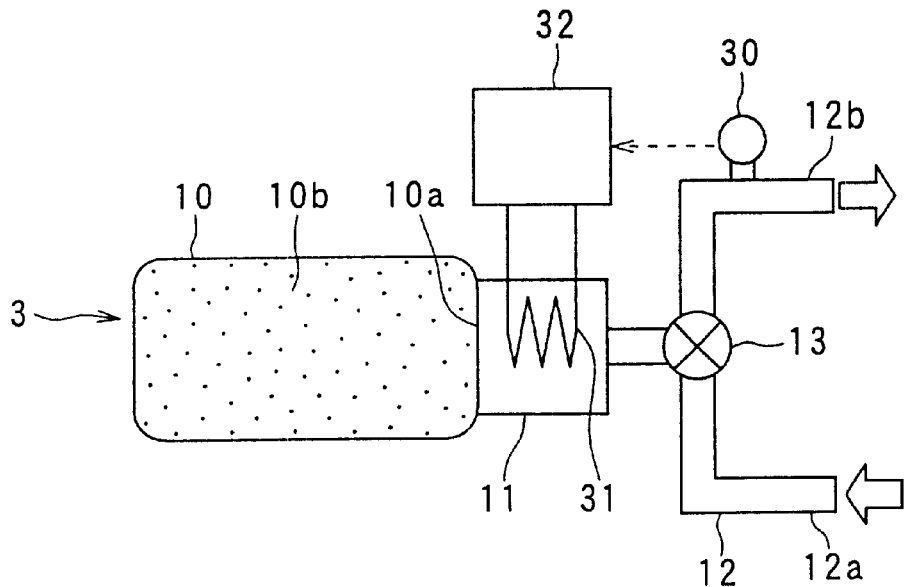
FIG. 3 is a schematic view showing a hydrogen storage unit according to a third embodiment of the invention.

As shown in FIG. 3, the hydrogen storage unit 3 according to the third embodiment is provided with a gas sensor 30, for detecting impurities contained in hydrogen gas discharged from the hydrogen storage container 10, in the piping 12 at the side of the consumption-equipment connection portion 12*b*. A gas sensor, which can detect one or plural impurities contained in hydrogen gas, is used as the gas sensor 30. The hydrogen storage unit 3 is provided with an electric heater (heating means) 31 for heating the filter portion 11. The electric heater 31 is connected to a controller 32, and the controller 32 controls the electric heater 31 based on signals from the gas sensor 30. Further, since cooling for adsorption is not required for certain types of adsorbents, a cooling means is not provided in the third embodiment.

Hereinafter, the operation of the hydrogen storage unit 3 according to the third embodiment will be described. First, hydrogen gas is charged from the hydrogen supply equipment into the hydrogen storage unit 3 in the same manner as in the above-described first embodiment. At this time, impurities contained in hydrogen gas are adsorbed at and eliminated by the filter portion 11.

Next, hydrogen gas is discharged from the hydrogen storage unit 3 to the hydrogen consumption equipment. At this time, the switching valve 13 is switched to set the hydrogen-gas flowing route from the hydrogen storage unit 3 to the consumption-equipment connection portion 12*b*, thereby starting hydrogen-gas discharge from the hydrogen absorption alloy 10*b*. The hydrogen gas discharged from the hydrogen absorption alloy 10*b* is supplied (discharged) to the hydrogen consumption equipment set outside through the filter portion 11.

The filter portion 11 is heated by the heater 31 at about 100° C., for example, thereby activating the active carbon of the filter portion 11, and enhancing the impurity elimination from the active carbon. When hydrogen gas passes through the filter portion 11, the impurities, adsorbed by the active carbon during hydrogen gas charging, are eliminated from the active carbon, and are contained in the hydrogen gas to be discharged into the hydrogen consumption equipment.

When hydrogen gas is discharged from the hydrogen storage unit 3 to the hydrogen consumption equipment, signals from the gas sensor 30 are input to the controller 32. If impurities are not detected in the hydrogen gas discharged from the hydrogen storage unit 3 based on the signals from the gas sensors 30, the impurity elimination from the filter portion 11 is determined completed. If the impurity elimination is completed, the filter portion 11 is not required to be heated by the electric heater 31. Therefore, when impurities cannot be detected, the controller stops heating the filter portion 11.

A hydrogen purity detector for detecting the purity of hydrogen gas can be provided in the hydrogen storage unit 3 in place of the gas sensor 32 for detecting impurities contained in hydrogen gas. The hydrogen purity detector detects the purity of hydrogen gas having flowed through the filter portion 11, thereby determining whether or not impurities are contained in the hydrogen gas. The filter portion 11 can also be provided within the hydrogen storage container 10 in the same manner as in the above-described second embodiment.

FOURTH EMBODIMENT

Figure 4:
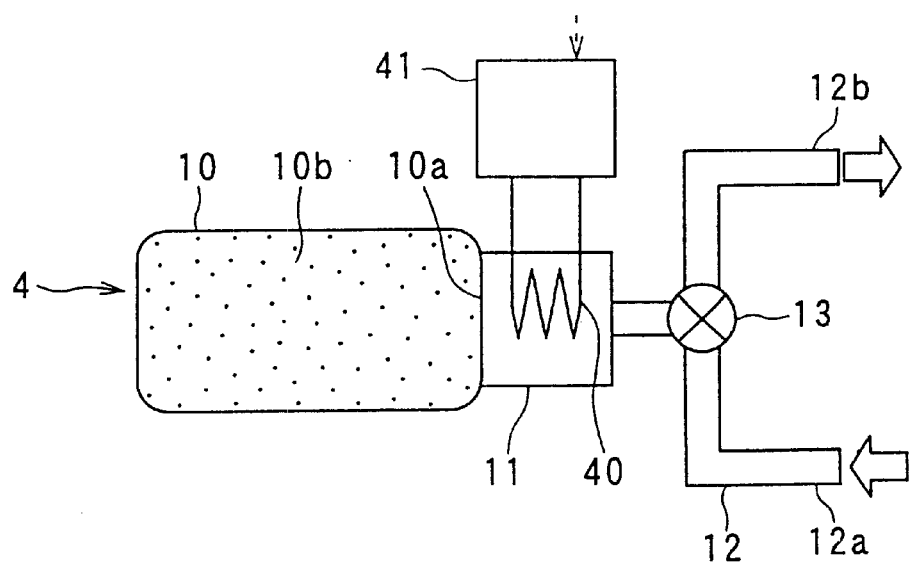
FIG. 4 is a schematic view showing a hydrogen storage unit according to a fourth embodiment of the invention.

In the hydrogen storage unit 4 according to the fourth embodiment, as shown in FIG. 4, an electric heater (heating means) 40 for heating the filter portion 11 is provided. The electric heater 40 is connected to a controller 41. The controller 41 controls the electric heater 40 based on the information relating to the hydrogen-gas charge (e.g., hydrogen gas charging time). Further, since cooling for adsorption is not required for some kinds of adsorbents to be used in the filter portion 11, a cooling means is not provided in the fourth embodiment.

A map is provided for the controller 41. In the map, a relationship between the time expended for charging hydrogen gas and the amount of impurities adsorbed in the filter portion 11 and a relationship between the amount of impurities adsorbed in the filter portion 11 and the time required for discharging impurities from the filter portion 11 are set. As the time expended for charging hydrogen gas becomes larger, the amount of impurities adsorbed in the filter portion 11 becomes larger, and the heating time required for eliminating the impurities from the filter portion 11 becomes longer. On the contrary, as the time expended for charging hydrogen gas becomes shorter, the time required for heating the filter portion 11 becomes shorter.

Figure 5:
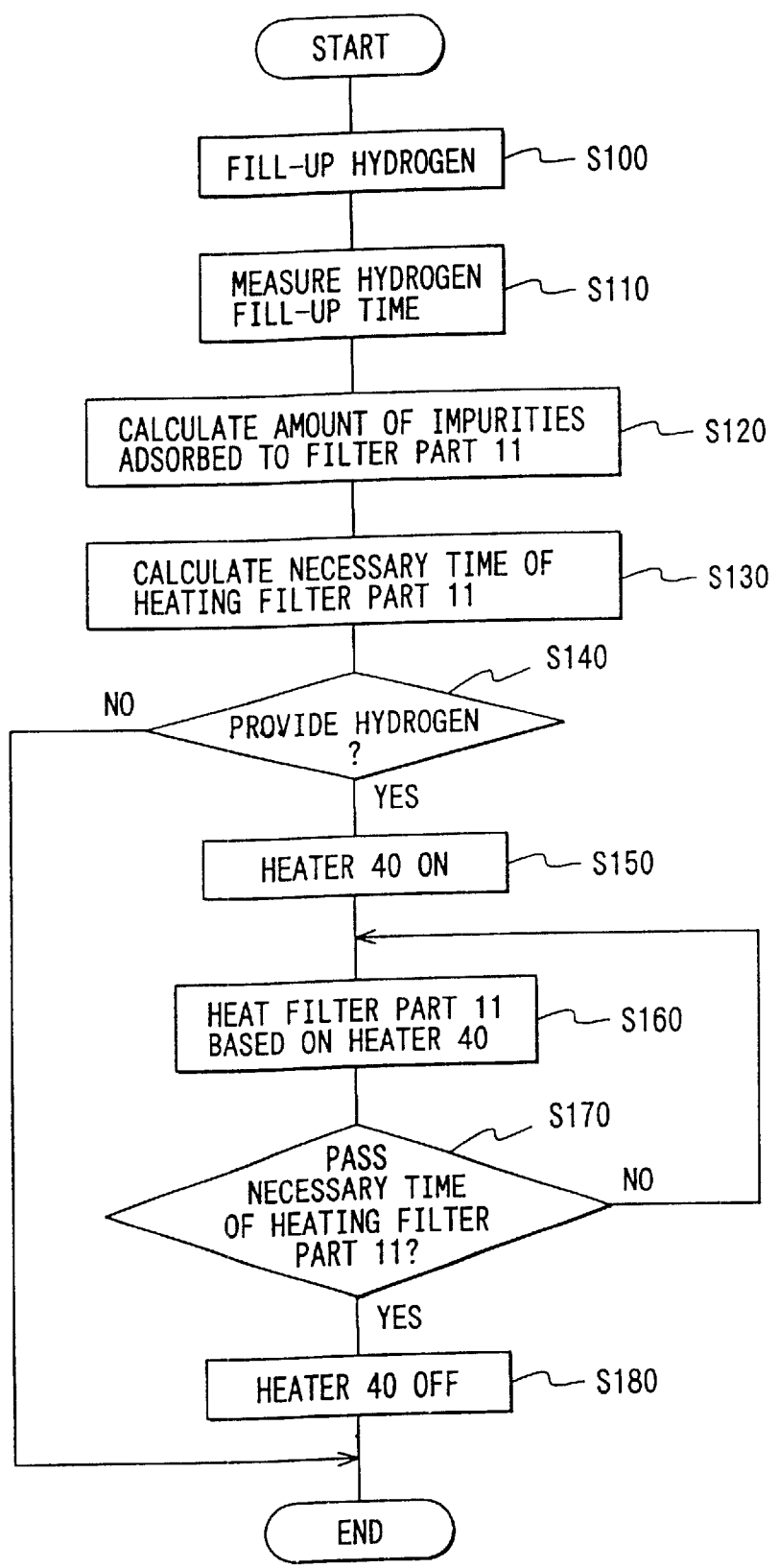
FIG. 5 is a flow chart showing an operation of the hydrogen storage unit according to the fourth embodiment.

Hereinafter, the operation of the hydrogen storage unit 4 according to the fourth embodiment will be described with reference to a flow chart shown in FIG. 5. First, hydrogen gas is charged from the hydrogen supply equipment into the hydrogen storage unit 4 at step S100. At the same time, the time expended for charging hydrogen gas is measured at a step S110. In the controller 41, the amount of impurities adsorbed in the filter portion 11 are calculated by using the time expended for charging hydrogen gas based on the above-described map at a step S120. Further, in the controller 41, the time required for heating the filter portion 11 is calculated based on the amount of impurities adsorbed in the filter portion 11, and is stored in a storage means (not shown in the drawing) at a step S130.

Next, it is determined whether or not hydrogen gas is supplied (discharged) from the hydrogen storage unit 4 to the hydrogen consumption equipment at a step S140. When hydrogen gas is not supplied to the hydrogen consumption equipment, the operation of the hydrogen storage unit 4 is ended. On the other hand, when hydrogen gas is supplied to the hydrogen consumption equipment, a power source of the electric heater 40 is turned on at a step S150, and the filter portion 11 is heated by the electric heater 40 at step S160. Thereby, the active carbon of the filter portion 11 is activated, and the impurity elimination from the active carbon is enhanced.

Next, it is determined whether heating time for filter portion 11 is longer than required for heating at step S170. When heating time for filter portion 11 is shorter than required, the operation of heating the filter portion 11 is continued. On the contrary, when it is longer than required, the power source of the electric heater 40 is turned off at step S180. Thereby, the operation of heating the filter portion 11 is stopped.

In the present embodiment, the controller controls the heating means 40 based on time expended for charging hydrogen gas. Also, the amount of hydrogen gas charged in the hydrogen storage unit 4 can be used as the information relating to the hydrogen gas charge. In this case, as the hydrogen-gas charge becomes larger, the amount of impurities adsorbed in the filter portion 11 becomes larger, and the time required to heat filter portion 11 becomes longer. On the contrary, when the hydrogen gas charge is small, heating time is short.

Further, the heating means 40 can be controlled by using an information relating to hydrogen gas consumption (e.g., the amount of hydrogen gas discharged to the hydrogen consumption equipment) in place of the information relating to the hydrogen gas charge. That is, as the flowing amount of hydrogen gas passing through the filter portion 11 becomes larger, impurities are eliminated from the filter portion 11 more rapidly, thereby shortening the time required for heating the filter portion 11 by the electric heater 40. On the contrary, as the flowing amount of hydrogen gas passing through the filter portion 11 becomes smaller, impurities are eliminated from the filter portion 11 more slowly. Therefore, the time required for heating the filter portion 11 by the electric heater 40 is required longer. Further, the hydrogen-gas consumption amount of the hydrogen consumption equipment, the hydrogen-gas consumption time thereof or the like can be used as the information relating to the hydrogen gas consumption. Also, filter portion 11 can be provided within the same hydrogen storage container 10 as in the second embodiment.

FIFTH EMBODIMENT

Figure 6:
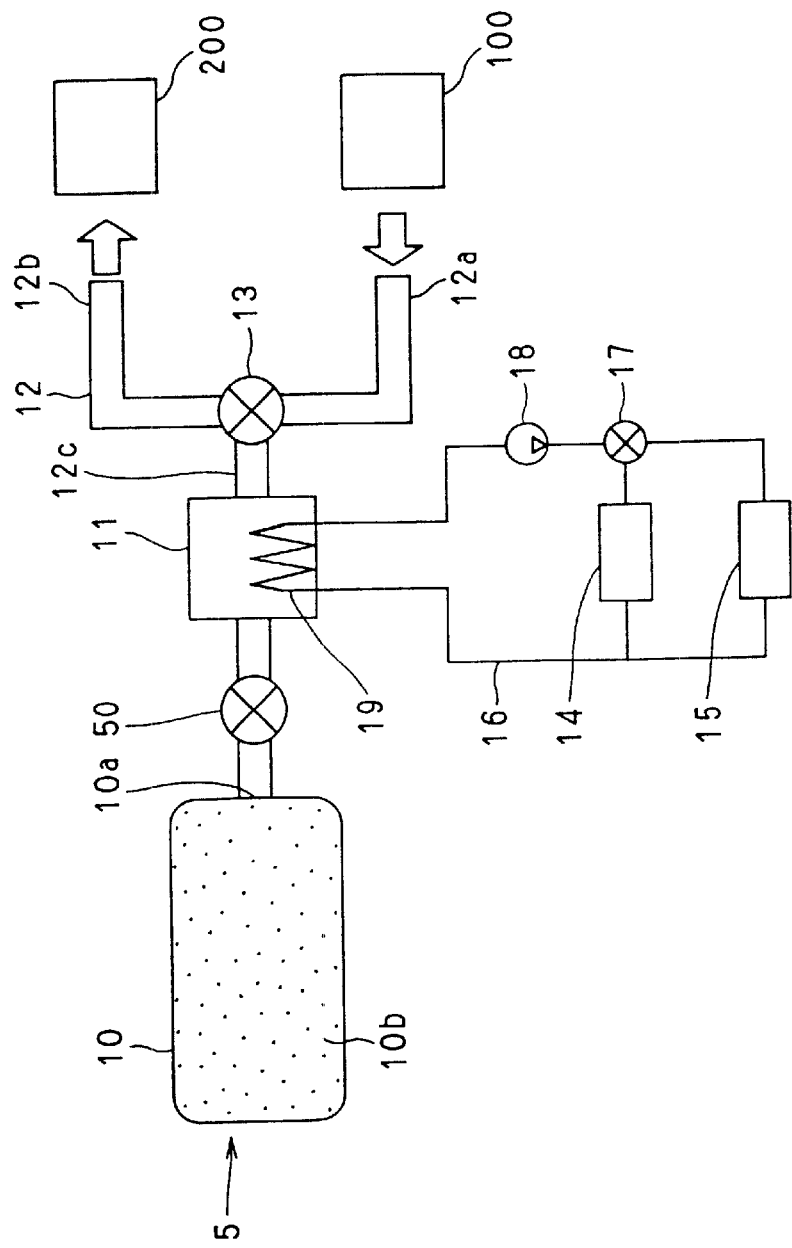
FIG. 6 is a schematic view showing a hydrogen storage unit according to a fifth embodiment of the invention.

In the hydrogen storage unit 5, as shown in FIG. 6, the hydrogen storage container 10 and the filter portion 11 are separated from each other, and the valve 50 is provided in piping between the hydrogen storage container 10 and the filter portion 11. When hydrogen gas is charged into or discharged from the hydrogen storage container 10, the valve 50 is opened. As such, when the filter portion 11 must be replaced due to failure, impurity gas is prevented from flowing into the hydrogen storage container 10 during replacement by closing the valve 50. When the filter portion 11 is independently recovered, the filter portion 11 can be recovered by closing the valve 50, thereby preventing the impurity gas from flowing into the hydrogen storage container 10.

SIXTH EMBODIMENT

Figure 7:
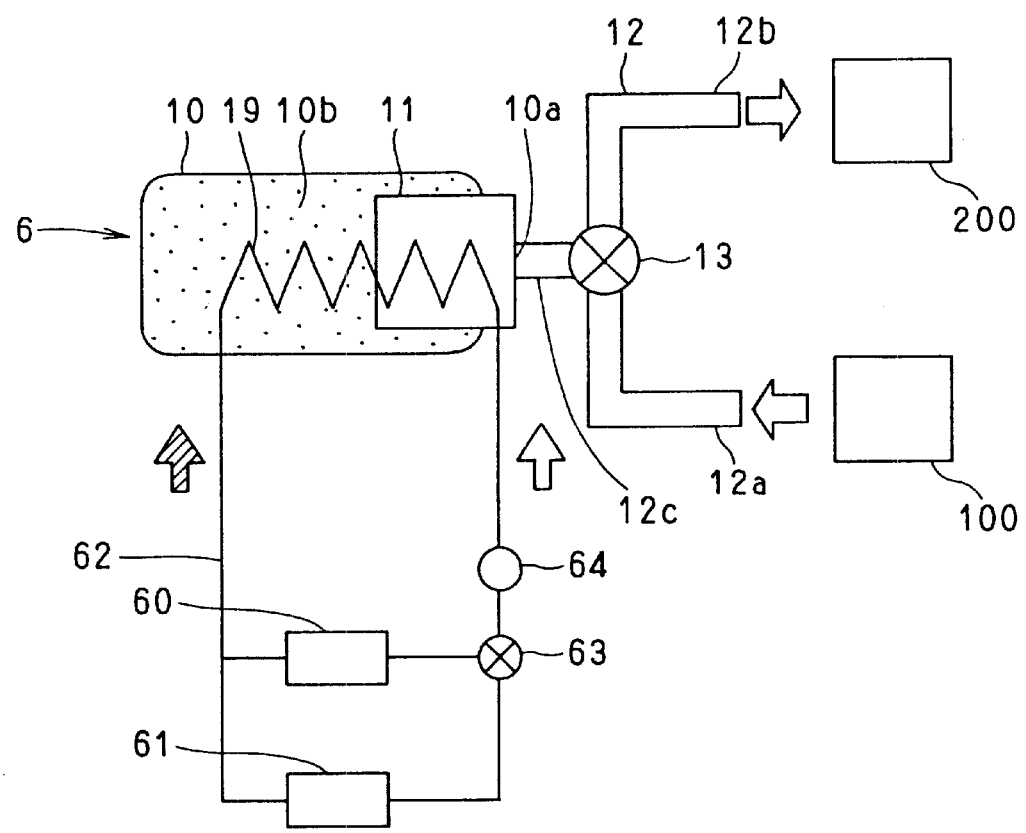
FIG. 7 is a schematic view showing a hydrogen storage unit according to a seventh embodiment of the invention.

As shown in FIG. 7, the hydrogen storage unit 6 is provided with the filter portion provided at an inner side of the hydrogen supply port 10a of the hydrogen storage container 10 (inside the hydrogen storage container 10). Further, the hydrogen storage unit 6 is provided with the hydrogen absorption alloy 10b contained in the hydrogen storage container 10, a radiator (cooling means) 60 for cooling the filter portion 11, and a heater (heating means) 61 for heating the filter portion 11.

The hydrogen storage container 10 and the filter portion 11 are cooled by the radiator 60 or heated by the heater 61 through a heat medium (e.g., fluid such as water) flowing in heat medium passage 62. The heat medium passage 62 is provided with a switching valve 63 for switching medium flowing routes between the radiator 60 and the heater 61, and a pump 64 for circulating the heat medium. In the sixth embodiment, the hydrogen storage unit 6 switches flowing directions of the heat medium flowing in the heat medium passage 62.

Hereinafter, in the hydrogen storage unit 6 according to the sixth embodiment, the flowing manner of the heat medium at charging time and discharging hydrogen gas will be described. The hydrogen absorption alloy 10b and the filter portion adsorbent 11 must be cooled to more effectively absorb hydrogen gas and adsorb impurities and must be heated to more effectively discharge hydrogen gas and eliminate impurities. During hydrogen gas charging, the concentration of impurity gas contained in the hydrogen gas becomes high due to air entering a connection portion of hydrogen-gas supply piping. At the initial time of charging hydrogen gas, therefore, since the impurities must be more effectively eliminated, the filter portion 11 must be cooled in preference to the hydrogen absorption alloy 10b. During hydrogen gas charging, therefore, the heat medium flowing within the heat medium passage 62 flows from the filter portion to the hydrogen absorption alloy 10b and, while the switching valve 63 is switched so that the heat medium flows into the side of the radiator 60. Accordingly, the filter portion 11 is cooled.

On the contrary, during discharge of hydrogen gas, the impurity gas must be gradually discharged to not cause excessive purity degradation of discharged hydrogen gas. Accordingly, during discharging, the filter portion 11 cannot be rapidly heated. Therefore, the heat medium flowing within the heat medium passage 62 flows from the hydrogen absorption alloy 10b and to the filter portion 11, while the switching valve 63 is switched so that the heat medium flows into the side of the heater 61. Thereby, since the heat medium heats the filter portion 11 after heating the hydrogen absorption alloy 10b and, the filter portion is prevented from being rapidly heated.

Since the flowing directions of the heat medium are predetermined during charging and discharging, the impurities contained in hydrogen gas can be more effectively eliminated during hydrogen gas charging, and excessive purity degradation of discharge hydrogen gas can be prevented during discharging hydrogen gas.

OTHER EMBODIMENTS

Although a hydrogen absorption alloy is used as a hydrogen absorption material in each of the above-described embodiments, a hydrogen absorption material of a carbon group such as a carbon nano-tube and a graphite nano-fiber can be used as a hydrogen absorption material without being limited to the above manner. Although active carbon is used as the filter portion 11 in each of the above-described embodiments, various kinds of adsorbents, suitable for impurities contained in hydrogen gas, can be used without being limited to the above manner. For example, if nitrogen is considered as an impurity, a nitrogen adsorbent such as particulate zeolite can be used as a filter portion.

Further, adsorbents utilizing chemical action, including an oxidation catalyst and a reduction catalyst, can be used other than such an adsorbent utilizing physical action. If moisture and oxygen are considered as impurities, a reduction copper catalyst, which can produce moisture by deoxidizing oxygen, is added to active carbon for adsorbing moisture, and the added active carbon ca be used as the filter portion. Here, after oxygen is changed to moisture by the reduction copper catalyst, the moisture is adsorbed by the active carbon. Furthermore, various kinds of adsorbents, respectively suitable for each material to be adsorbed, can be suitably mixed according to objects, and can be used.

While the above-described embodiments refer to examples of usage of the present invention, it is understood that the present invention may be applied to other usage, modifications and variations of the same, and is not limited to the disclosure provided herein.

What is claimed is:

1. A hydrogen storage unit for charging and discharging hydrogen gas, the hydrogen storage unit comprising:

a hydrogen storage container containing a hydrogen absorption material, wherein the hydrogen storage unit is adapted to be supplied hydrogen from hydrogen supplying equipment and adapted to supply hydrogen to hydrogen consumption equipment;

a filter portion including an adsorbent for adsorbing impurities contained in hydrogen gas stored in the hydrogen storage unit, wherein the filter is arranged in a hydrogen flow path and wherein the hydrogen is supplied to the hydrogen consumption equipment through the filter from the hydrogen storage unit;

a heat supply means including heating means for heating the filter portion to enhance elimination of impurities adsorbed by the adsorbent, the heat supply means provided in the filter portion; and a gas sensor located on the hydrogen storage unit to detect the impurities eliminated from the filter part when hydrogen is supplied from the hydrogen storage unit to the hydrogen consumption equipment through the filter;

wherein the heat supply means stops heating the filter according to a level of impurities detected by the gas sensor.

2. The hydrogen storage unit according to claim 1, wherein the heat supply means further includes a cooling means for enhancing adsorption of the impurities in the filter portion adsorbent.

3. The hydrogen storage unit according to claim 1, wherein the heating means is controlled based on information relating to a hydrogen gas charge in said hydrogen storage container.

4. The hydrogen storage unit according to claim 1, wherein the heating means is controlled based on information relating to a hydrogen gas consumption of gas contained in said hydrogen storage container.

5. The hydrogen storage unit according to claim 1, wherein the filter portion is provided outside the hydrogen storage container.

6. The hydrogen storage unit according to claim 1, wherein the filter portion is provided inside the hydrogen storage container.

7. The hydrogen storage unit according to claim 1, wherein the filter portion and the hydrogen storage container are disposed so that hydrogen gas flows through the filter portion during a hydrogen storage mode and a hydrogen discharge mode, hydrogen gas being discharged outside said hydrogen storage container during said hydrogen discharge mode, hydrogen gas being stored in the hydrogen storage container during said hydrogen storage mode.

8. The hydrogen storage unit according to claim 7, further comprising:

a first supply portion connected to hydrogen supply equipment;

a second supply portion connected to hydrogen consumption equipment;

a third supply portion connected to the hydrogen storage container; and a supply line including a switching portion for switching connection conditions between the first supply portion and the third supply portion, said switching portion for switching connection conditions between the second supply portion and the third supply portion.

9. The hydrogen storage unit according to claim 8, wherein:

the hydrogen storage container has a closed end and a second end having a hydrogen supply port; and the filter portion is disposed at the hydrogen supply port.

10. The hydrogen storage unit according to claim 8, wherein:

the hydrogen storage container and the filter portion are separated from each other, wherein a valve is provided between said filter portion and said storage container; and wherein the valve is open during hydrogen gas charging of the hydrogen storage container and during discharging of hydrogen gas from the hydrogen gas container.

11. A hydrogen storage unit for charging and discharging hydrogen gas, comprising:

a hydrogen storage container containing a hydrogen absorption material, wherein the hydrogen storage unit is adapted to be supplied hydrogen from hydrogen supplying equipment and adapted to supply hydrogen to hydrogen consumption equipment;

a filter portion including an adsorbent for adsorbing impurities contained in hydrogen gas stored in the hydrogen storage unit, wherein the filter is arranged in a hydrogen flow path and wherein the hydrogen is supplied to the hydrogen consumption equipment through the filter from the hydrogen storage unit;

a heating and cooling unit including a heating means for heating at least the filter portion or the hydrogen storage container, said heating and cooling unit cooling at least the filter portion or the hydrogen storage container, said heating and cooling unit heating the filter portion to enhance elimination of impurities adsorbed in the adsorbent, said heating and cooling unit cooling the filter portion to enhance adsorption of impurities by the adsorbent;

wherein the hydrogen storage container is cooled by the cooling means after the filter portion is cooled during storing hydrogen gas in the hydrogen storage container; and wherein the filter portion is heated by the heating means after the hydrogen storage container is heated during discharging hydrogen gas from the hydrogen gas container; and a gas sensor located on the hydrogen storage unit to detect the impurities eliminated from the filter part when hydrogen is supplied from the hydrogen storage unit to the hydrogen consumption equipment through the filter;

wherein the heat supply means stops heating the filter according to a level of impurities detected by the gas sensor.

12. A storage unit for charging and discharging hydrogen gas, the storage unit comprising:

a storage container containing an absorption material that absorbs said hydrogen gas, wherein the hydrogen storage unit is adapted to be supplied hydrogen from hydrogen supplying equipment and adapted to supply hydrogen to hydrogen consumption equipment;

a filter including an adsorbent that adsorbs impurities from said hydrogen gas, said filter being positioned along a fluid path that fluidly connects an interior of said storage container with an external environment, wherein the hydrogen is supplied to the hydrogen consumption equipment through the filter from the hydrogen storage unit;

a heater in thermal communication with said filter;

wherein said heater heats said filter when hydrogen gas is transferred from inside said storage container, through said filter and to said external environment; and a gas sensor located on the hydrogen storage unit to detect the impurities eliminated from the filter part when hydrogen gas is supplied from the hydrogen storage unit to the hydrogen consumption equipment through the filter;

wherein the heat supply means stops heating the filter according to a level of impurities detected by the gas sensor.

13. A storage container as claimed in claim 12, further comprising a cooling unit that cools said filter, said cooling unit cooling said filter when said gas is passed from said external environment, through said filter and into said storage container.

* * * * *